Figure 1:
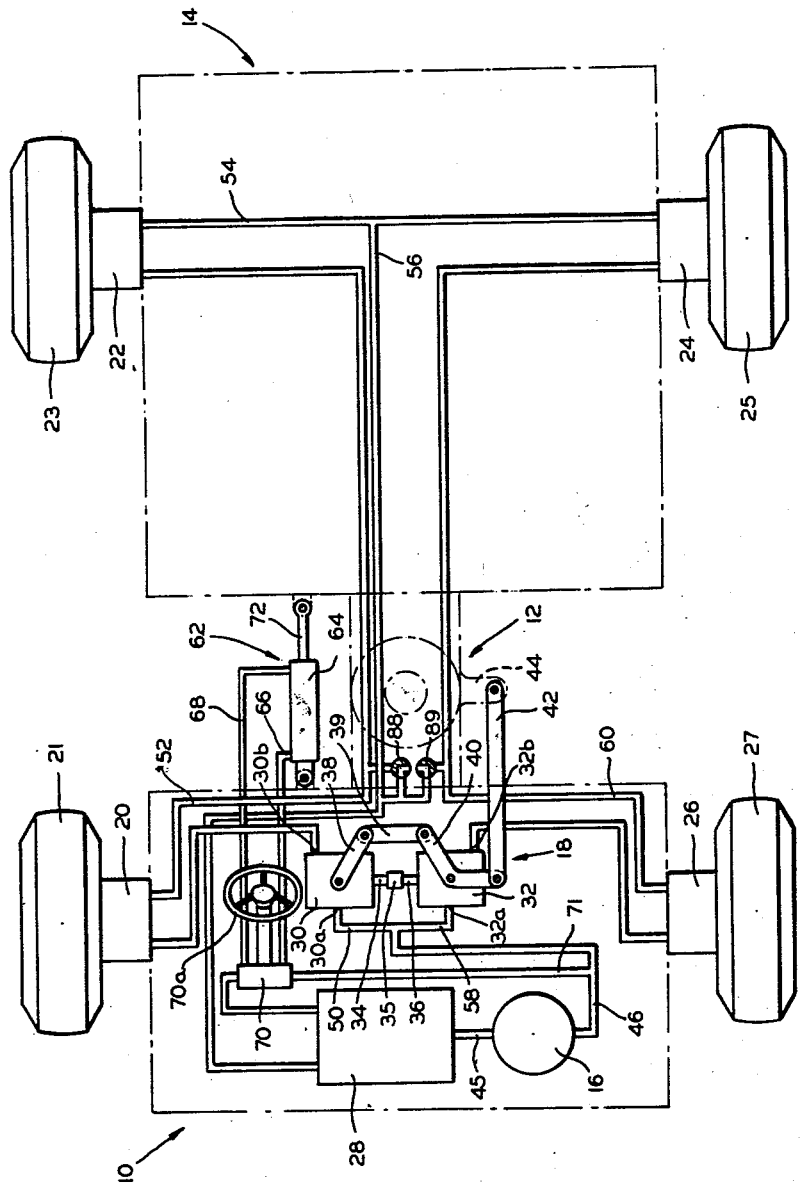

INVENTOR.
CYRIL B. ROGERS
ATTORNEY

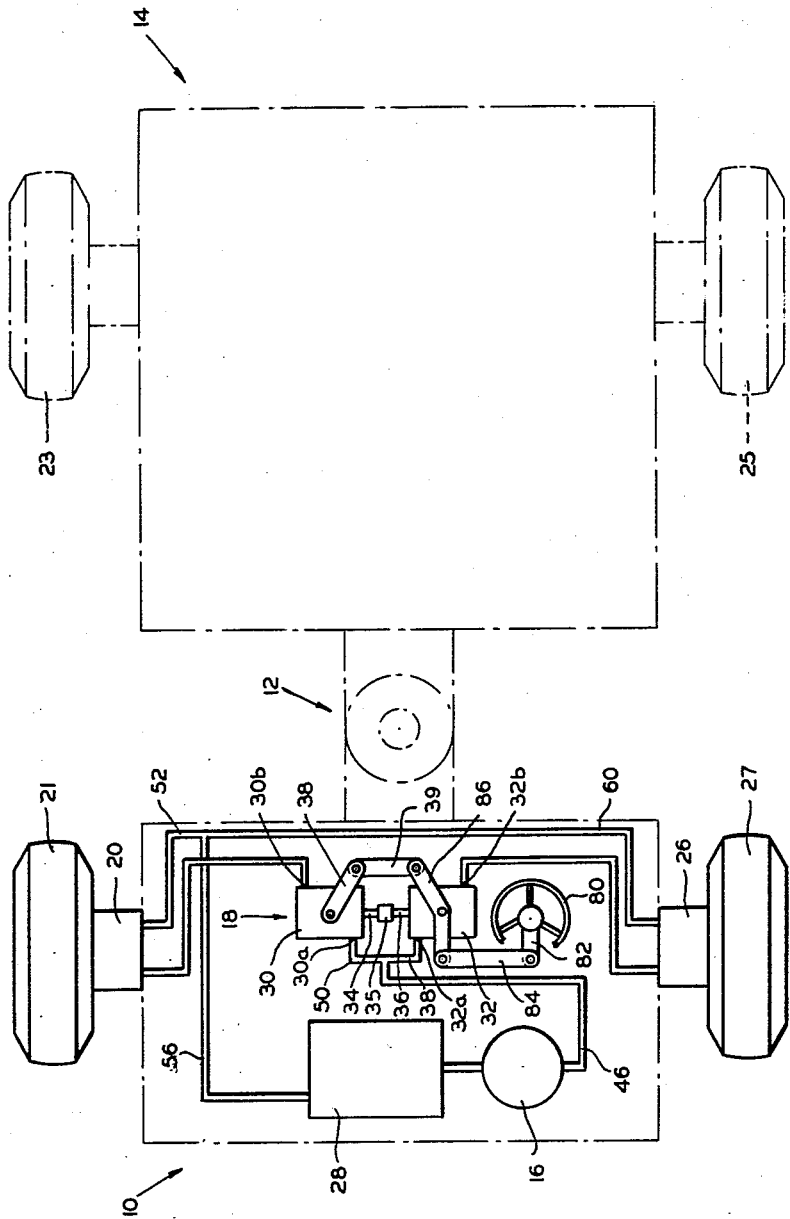

United States Patent Office 3,151,694
Patented Oct. 6, 1964

3,151,694
STEERING ARRANGEMENT AND HYDROSTATIC
DRIVE FOR ARTICULATED VEHICLE
Cyril B. Rogers, Battle Creek, Mich., assignor to Clark
Equipment Company, a corporation of Michigan
Filed May 11, 1961, Ser. No. 109,421
6 Claims. (Cl. 180—51)

This invention relates to hydrostatic drives, and more particularly to steering means for articulated vehicles equipped with hydrostatic drive.

Hydrostatic drives for vehicles are known in which each wheel of the vehicle is separately driven by an hydraulic motor while all hydraulic motors are supplied with an operating fluid under pressure by a single pump. It is possible to connect such hydraulic motors either in series or in parallel or a combination thereof. Any of the above ways of connecting the hydraulic motors have certain inherent disadvantages. For example, in the event that a vehicle driven by a hydrostatic drive having the hydraulic motors connected in parallel has one of the wheels resting on slippery ground, or one of the wheels cannot exert any traction due to an uneven surface of the ground, such wheel will spin at an excessive speed, while all other wheels cannot exert any significant amount of traction beacuse of the drop in pressure of the fluid supply. This effect is comparable to the differential effect occurring in vehicles with mechanical drive provided with differential gears. In a vehicle driven by hydrostatic drive with its motors connected in series, there is no longer the inherent differential effect present as when the motors are connected in parallel. This arrangement avoids the foregoing problem but at the same time results in a new problem, namely, that the lack of differential action causes "scrubbing" or sliding of the wheels during a normal turn. Since the outer wheel must travel a greater distance during a turn than the inner wheel, there must be some such slippage of one or both wheels during a turn if both wheels continue to operate at exactly the same speed as in a series connection.

The object of the present invention is to provide in a hydrostatic drive system means for avoiding both of the afore-mentioned difficulties.

In carrying out my invention I provide a pair of variable displacement fluid devices having their shafts coupled for conjoint rotation. Such fluid devices preferably are the swash plate type which is well-known in the art for use as both pumps and motors. The swash plate of each fluid device is coupled with the other swash plate for coordinated movement such that as the displacement of one device increases, the displacement of the other decreases. Pressurized fluid is supplied to each fluid device from a common source, the outlet of one of the fluid devices supplying pressurized fluid to the hydraulic motors on one side of the vehicle and the outlet of the other fluid device supplying pressure fluid to the hydraulic motors on the other side of the vehicle.

In one preferred form of the invention the swash plates are controlled responsively to pivotal movements between two parts of the vehicle, in a manner to introduce a controlled differential action.

In another preferred form of the invention the swash plates are controlled by the operator to produce turning of the vehicle by unbalancing the fluid flow to the motors on the two opposite sides thereof.

For a clearer and more complete understanding of my invention, reference should be had to the following detailed description taken in conjunction with the accompanying drawing in which:

FIGURE 1 is a schematic representation of an articulated vehicle with hydrostatic drive embodying the first form of the invention mentioned above, while FIGURE 2 is a schematic representation of an articulated vehicle with hydrostatic drive embodying the other form of the invention mentioned previously.

Referring now to FIG. 1, the numeral 10 denotes the front portion of an articulated wheeled vehicle which front portion is connected by means of a combined steering and draft coupling 12 to a rear portion 14 of the articulated vehicle.

The vehicle is propelled by means of a hydrostatic drive system comprising a fluid pressure device or pump 16 driven by any suitable means such as an internal combustion engine (not shown), an adjustable flow proportioning means 18, a plurality of hydraulic motors 20, 22, 24 and 26 for driving each of the vehicle's wheels and a sump or reservoir 28.

The adjustable flow proportioning means comprises a pair of variable displacement fluid device 30 and 32 preferably of the swash plate type such as shown in Patent No. 765,434. Although other equivalent variable displacement fluid devices may be used if desired. The fluid devices 30 and 32 have their respective shafts 34 and 36 coupled for rotation together by means of coupling 35. The swash plates of fluid devices 30 and 32 are connected together for simultaneous and coordinated actuation by means of a linkage which includes a lever 38 fixedly connected to the swash plate of device 30, a bell crank lever 40 which is fixedly connected to the swash plate of fluid device 32, and pivotally connected link 39 which joins levers 38 and 40.

The other end of the bell crank lever 40 is pivotally connected by means of a drag link 42 to a horizontally extending arm 44 which is secured to a portion of the steering and draft coupling 12 which is attached to the rear portion 14 of the vehicle.

Fluid supplied by the pump 16, after being drawn from sump 28 through conduit 45, is supplied under pressure through a conduit 46 to separate conduits 50 and 58 which supply respectively the drive motors on opposite sides of the vehicle. Connected in conduit 50 is the fluid device 30, the pressurized fluid entering device 30 through inlet 30a and leaving through outlet 30b from whence it is conducted by the conduit 50 to the hydraulic motor 20 for driving the right front wheel 21. The pressure fluid is conducted to hydraulic motor 22 for driving the right rear wheel 23 by conduit 52, and is then returned to the sump 28 by means of conduits 54 and 56. Fluid device 32 is similarly connected in conduit 58, fluid entering through inlet 32a and leaving through outlet 32b, and thence flowing to hydraulic motor 26 for driving the left front wheel 27. The fluid is then conducted by conduit 60 to hydraulic motor 24 for driving the left rear wheel 25, after which such pressure fluid is returned to the sump by means of conduits 54 and 56.

The vehicle is turned by pivoting the front portion 10 with respect to the rear portion 14. Such pivoting is accomplished by means of a fluid pressure operated piston and cylinder assembly or actuator 62 disposed between the front portion 10 and the rear portion 14 of the vehicle. The piston and cylinder assembly is pivotally connected at one end to the front portion 10 and pivotally connected at its other end to the rear portion 14. The cylinder 64 of the actuator 62 is connected by means of conduits 66 and 68 to a steering control valve 70 which is supplied with pressure fluid by means of a conduit 71. The valve 70 is operated by an operator's steering wheel 70a. The valve 70 is a four-way valve which is adapted to supply pressure fluid selectively to either side of the internal piston (not shown) which is mounted on the end of rod 72 and connect the other side of the piston for drain to the sump 28, thereby extending or retracting motor 62 and turning the front portion 10 of the vehicle with respect to rear portion 14 in the desired direction about the axis of coupling 12.

As the vehicle is turned by actuation of the cylinder and piston assembly 62 to cause the front portion 10 to pivot with respect to the rear portion 14, the swash plates of the fluid devices 30 and 32 are actuated by means of the linkage 42, 40, 39, 38 in a manner such that the flow of pressure fluid delivered to the hydraulic motors for the wheels on the inside of the turn is decreased and the flow of pressure fluid delivered to the hydraulic motors for the wheels on the outside of the turn is increased proportionally to the extent of the turn, thus eliminating wheel scrub.

It will be understood that during operation of the vehicle the pressurized fluid to the drive motors on opposite sides of the vehicle flows respectively through the two variable displacement fluid devices. During operation of the drive motors, such devices rotate continuously and during straight ahead operation of the vehicle they operate in effect as motors which are idling and carrying no load. Since the two fluid devices are connected together they, of course, always operate at the same speed. During a turn, the displacement of the device directing fluid to the motors on the outside of the turn is increased and the displacement of the other device is decreased. Consequently, a greater quantity of pressure fluid is directed to the motors on the outside of the turn, causing them to rotate faster, and a lesser quantity of fluid is directed to the motors on the inside of the turn, causing them to rotate slower. It will be understood that the total quantity of fluid being delivered to the devices remains constant during a turn, assuming that vehicle speed is maintained constant.

In the event that traction is lost on one side of the vehicle, the device on that side begins to operate as a motor and drives the other device through the mechanical connection as a pump, thus increasing the pressure of the fluid flowing to the motors on the side having traction. This increases the tractive effort of the motors and wheels on the side having traction.

While a vehicle with four-wheel drive has been illustrated in FIG. 1 of the drawing, it will be apparent that the present invention is not limited to hydrostatic drive systems for four-wheel drive vehicles. To illustrate this I have shown by-pass valves 88 and 90. These are normally closed when four-wheel drive operation is desired. If it is desired to have only the two front wheels driving these two by-pass valves are opened so that the pressure fluid flows directly from the two front wheels back to the sump and does not pass through the drive motors for the rear wheels. It will be appreciated that the present hydrostatic drive system is basically a parallel system, that is, the wheel or wheels on one side of the vehicle are supplied by the pump in parallel with the wheels on the other side. However, it is a combined parallel-series system when all four wheels are driving inasmuch as the front and rear wheel on each side of the vehicle are connected in series in the respective branch fluid circuit from the pump.

FIGURE 2 of the drawing shows an embodiment of my invention which is adapted to effect steering in an articulated vehicle having two-wheel drive. The same identifying numerals have been used for like parts in FIGS. 1 and 2.

In FIG. 2, the respective swash plates of fluid devices 30 and 32 are operatively connected to an operator's steering device 80 having an outwardly extending arm 82. A drag link 84 pivotally connects the arm 82 with a bell crank lever 86 which is fixedly connected to the swash plate of fluid device 32 and pivotally connected to link 39. Also, conduits 52 and 60 are directly connected to the conduit 56 which returns fluid to reservoir 28.

It will be observed that in the embodiment of FIGURE 2 the piston and cylinder motor 62 of FIG. 1 and the hydraulic circuitry associated therewith are no longer necessary.

In the operation of the embodiment of FIG. 2, the operator turns steering device 80 in the direction of the desired turn to be accomplished by the vehicle. Such movement of device 80 through link 84 actuates the swash plates of both of the fluid devices 30 and 32, but in opposite directions. Such actuation of the variable displacement fluid devices results in a decreased amount of flow of pressure fluid to the wheel on one side of the vehicle and an increased amount of flow of pressure fluid to the wheel on the other side. This causes the former wheel to slow down and the latter wheel to speed up with the result that the vehicle turns toward the side of the vehicle on which the wheel slows down, the front portion 10 of the vehicle pivoting with respect to the rear portion 14 during such turning operation.

While certain preferred embodiments of the invention have been described and illustrated herein, it will be appreciated by those skilled in the art that modifications may be made in the invention. It should be understood therefore that I intend to cover by the appended claims all such modifications which fall within the true spirit and scope of my invention.

I claim:

1. In an articulated wheeled vehicle having a front portion pivotally connected by means of a combined steering and draft coupling to a rear portion, a hydrostatic drive comprising pump means for supplying fluid under pressure for propelling the vehicle, a pair of individual motors connected in series for driving the wheels on one side of the vehicle, another pair of individual motors connected in series for driving the wheels on the other side of the vehicle, said pairs of motors being connected in parallel to the pump means for the supply of driving fluid thereby, adjustable flow proportioning means comprising a pair of rotatable variable displacement fluid devices coupled together for conjoint rotation, the said fluid devices being connected respectively in circuit with said pairs of motors, and linkage means for connecting said devices so that a change in the displacement of one of said devices is accompanied by an opposite change in the displacement of the other of said devices.

2. In combination, an articulated wheeled vehicle having a front portion and a rear portion, said portions being pivotally connected by means of a combined steering and draft coupling, and a hydrostatic drive comprising pump means for supplying fluid under pressure for propelling the said vehicle, a pair of motors connected in series for driving the wheels on one side of the vehicle, another pair of motors connected in series for driving the wheels on the opposite side of said vehicle, said pairs of motors being connected in parallel to the pump means for the supply of pressurized fluid thereto, a pair of rotatable variable displacement fluid devices coupled together for conjoint rotation, said fluid devices being connected respectively in circuit with said pairs of motors, and linkage means connecting said devices so that a change in the displacement of one said device is accompanied by an opposite change in the displacement of the other said device.

3. In an articulated wheeled vehicle having a front portion pivotally connected by means of a combined steering and draft coupling to a rear portion, a hydrostatic drive comprising pump means for supplying fluid under pressure for propelling the vehicle, two individual motors for driving wheels on opposite sides of the vehicle, two separate conduits for conducting fluid from the said pump means to the said motors respectively, adjustable flow proportioning means comprising a pair of variable displacement fluid devices coupled together mechanically for conjoint operation and connected respectively in circuit in the said conduits, conduit means for returning fluid from said motors to said pump means, steering means connected between the front and rear portions of the vehicle for changing the angle between such portions and thereby accomplishing steering, an operator's steering device for actuating the said steering means, and means responsive to the angular position of the front and rear portions of the vehicle for changing the displacement of both said fluid devices simultaneously but in opposite senses in a manner such that the fluid flow to the motor for the inside wheel is reduced and the fluid flow to the motor for the outside wheel is increased during a turn by the vehicle.

4. In an articulated wheeled vehicle having a front portion pivotally connected by means of a combined steering and draft coupling to a rear portion, a hydrostatic drive comprising pump means for supplying fluid under pressure for propelling the vehicle and individual motors for driving wheels on opposite sides of the vehicle, steering means connected between the front and rear portions of the vehicle for changing the angle between such portions and thereby accomplishing steering, adjustable flow proportioning means comprising a pair of variable displacement fluid devices coupled together for conjoint operation and connected respectively in circuit with said motors, and means responsive to the angular position of the front and rear portions of the vehicle for changing the displacement of one of the said fluid devices in one sense while changing the displacement of the other of said fluid devices an equal amount in the opposite sense such that the fluid flow to the motor for the inside wheel is reduced and the fluid flow to the motor for the outside wheel is increased during a turn by the vehicle.

5. In an articulated wheeled vehicle having a front portion pivotally connected by means of combined steering and draft coupling to a rear portion, a hydrostatic drive comprising pump means for supplying fluid under pressure for propelling the vehicle, a pair of individual motors connected in series for driving the wheels on one side of the vehicle, another pair of individual motors connected in series for driving the wheels on the opposite side of the vehicle, said pairs of motors being connected in parallel to the said pump means for supply of fluid thereby, steering means connected between the front and rear portions of the vehicle for changing the angle between such portions and thereby accomplishing steering, an operator's device for actuating the steering means, adjustable flow proportioning means comprising a pair of variable displacement fluid devices coupled together for conjoint operation and connected respectively in circuit with said motors, and means responsive to the angular position of the front and rear portions of the vehicle for changing the displacement of one of the said fluid devices in one sense while changing the displacement of the other fluid device in the opposite sense such that the fluid flow to the motors for the inside wheels is reduced and the fluid flow to the motors for the outside wheels is increased during a turn by the vehicle.

6. In an articulated wheeled vehicle having a front portion, a rear portion pivotally connected to the front portion through a combined steering and draft coupling, a pair of hydraulic motors connected to drive wheels on opposite sides of the vehicle respectively, a pump for supplying pressurized fluid for operating the hydraulic motors, conduit means interconnecting the pump and the hydraulic motors for conducting fluid therebetween, and actuator means interconnecting the front and rear portions of the vehicle for pivoting one portion with respect to the other to effect steering of the vehicle, adjustable flow proportioning means mounted on one portion of the vehicle comprising a pair of variable displacement fluid devices, said devices being connected for rotation together and being connected respectively in circuit between the pump and the hydraulic motors on opposite sides of the vehicle whereby the pressurized fluid for operating the hydraulic motor on one side flows through one said fluid device and the pressurized fluid for operating the motor on the other side of the vehicle flows through the other said fluid device, and linkage means connected between the other portion of the vehicle and both of the said fluid devices for adjusting the flow of pressurized fluid through such devices responsively to the angle between the two portions of the vehicle, whereby the flow of pressurized fluid through the said devices is equal when the steering angle is zero, increasingly greater through one said device and increasingly less through the other said device as the steering angle increased toward one side as the front portion is pivoted with respect to the rear portion during steering, and increasingly greater through said other device and increasingly less through said one device as the angle increases toward the opposite side as the front portion is pivoted with respect to the rear portion during steering, thereby preventing scrubbing of the wheels as the vehicle is steered.

References Cited in the file of this patent

UNITED STATES PATENTS

| | | |
|---|---|---|
| 2,060,220 | Kennedy | Nov. 10, 1936 |
| 2,361,098 | Higby | Oct. 24, 1944 |
| 2,393,324 | Joy | Jan. 22, 1946 |
| 2,833,557 | Palmiter | May 6, 1958 |
| 2,941,609 | Bowers et al. | June 21, 1960 |

FOREIGN PATENTS

| | | |
|---|---|---|
| 1,252,362 | France | Dec. 19, 1960 |